United States Patent [19]

Bartholomew

[11] Patent Number: 4,524,995
[45] Date of Patent: Jun. 25, 1985

[54] SWIVELABLE QUICK CONNECTOR ASSEMBLY

[75] Inventor: Donald D. Bartholomew, Marine City, Mich.

[73] Assignee: Proprietary Technology, Inc., Southfield, Mich.

[21] Appl. No.: 513,847

[22] Filed: Jul. 14, 1983

Related U.S. Application Data

[62] Division of Ser. No. 201,711, Oct. 29, 1980, Pat. No. 4,423,892.

[51] Int. Cl.³ ............................................ F16L 37/14
[52] U.S. Cl. ..................................... 285/54; 285/281; 285/305; 285/DIG. 22
[58] Field of Search .................. 285/305, 54, DIG.25, 285/281, DIG.22

[56]         References Cited
        U.S. PATENT DOCUMENTS

| | | | |
|---|---|---|---|
| 921,691 | 5/1909 | Friday | 285/DIG. 22 X |
| 1,542,421 | 6/1925 | Strongson | |
| 2,123,889 | 7/1939 | Gleason | |
| 2,441,344 | 5/1948 | Bosworth | 285/321 |
| 2,585,887 | 2/1952 | Woodward | 285/319 X |
| 3,314,696 | 4/1967 | Ferguson et al. | 285/DIG. 22 X |
| 3,450,424 | 6/1969 | Calisher | |
| 3,453,005 | 7/1969 | Foults | |
| 3,527,485 | 9/1970 | Goward et al. | 285/305 |
| 3,534,988 | 10/1970 | Lindsey | |
| 3,538,940 | 11/1970 | Graham | |
| 3,574,359 | 4/1971 | Klein | |
| 3,584,902 | 6/1971 | Vyse | 285/DIG. 25 X |
| 3,628,768 | 12/1971 | Hutt | 285/305 X |
| 3,711,125 | 1/1973 | Dehar | 285/319 X |
| 3,718,350 | 2/1973 | Klein | |
| 3,724,882 | 4/1973 | Dehar | |
| 3,826,523 | 7/1974 | Eschbaugh | 285/319 X |
| 3,929,356 | 12/1975 | De Vincent et al. | |
| 3,929,357 | 12/1975 | De Vincent et al. | |
| 3,980,324 | 9/1976 | Bouteille et al. | |
| 4,005,883 | 2/1977 | Guest | 285/322 |
| 4,009,896 | 3/1977 | Brewer | |
| 4,080,752 | 3/1978 | Burge | |
| 4,111,464 | 9/1978 | Asano et al. | |
| 4,123,089 | 10/1978 | Viero et al. | |
| 4,123,091 | 10/1978 | Cosentino et al. | |
| 4,128,264 | 12/1978 | Oldford | |
| 4,135,745 | 1/1979 | Dehar | 285/DIG. 22 X |
| 4,214,586 | 7/1980 | Mericle | 285/DIG. 22 X |
| 4,244,608 | 1/1981 | Stuemky | 285/305 |
| 4,266,814 | 5/1981 | Gallagher | 285/319 |

FOREIGN PATENT DOCUMENTS

| | | | |
|---|---|---|---|
| 163947 | 9/1949 | Austria | 285/305 |
| 2360921 | 6/1974 | Fed. Rep. of Germany | 285/305 |
| 2307154 | 8/1974 | Fed. Rep. of Germany | 285/319 |
| 2611233 | 9/1977 | Fed. Rep. of Germany | 285/319 |
| 2622269 | 11/1977 | Fed. Rep. of Germany | 285/308 |
| 718350 | 11/1954 | United Kingdom | 285/54 |
| 1030535 | 5/1966 | United Kingdom | 285/305 |
| 1145667 | 3/1969 | United Kingdom | 285/305 |

*Primary Examiner*—Thomas F. Callaghan
*Attorney, Agent, or Firm*—Harness, Dickey & Pierce

[57]         ABSTRACT

A swivelable quick connect assembly for use with tubular conduits is disclosed as comprising a housing having an axial bore for receiving one end of the conduit, an elastomeric ring-like seal is disposed in the bore for providing a fluidtight seal between confronting portions of the conduit and the housing, an annular bushing is disposed in the bore for positioning the seal and for guiding the one end of the conduit into nesting relationship with the bore, and a retainer is detachably secured to the housing and is cooperable with an annular projection on the conduit for securing the conduit in its operative position within the bore, the retainer having resilient deformable portions which are adapted to snap over the locking wall upon insertion of the conduit into the housing bore.

30 Claims, 14 Drawing Figures

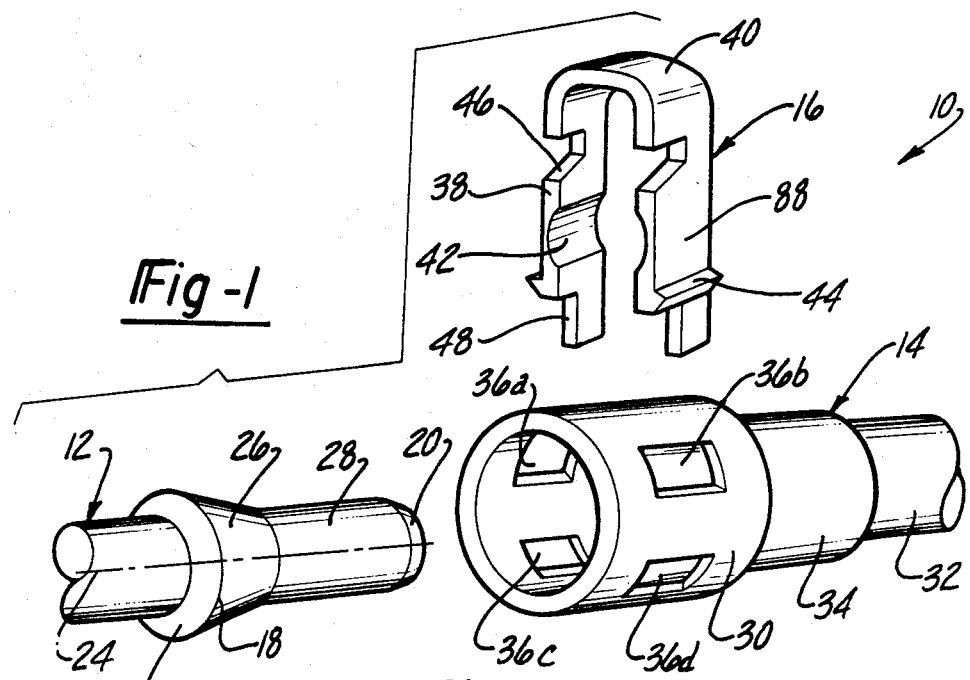
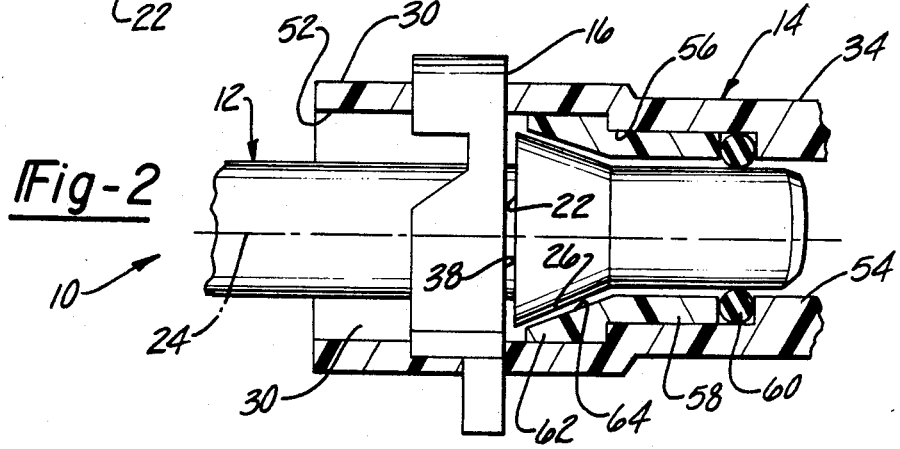
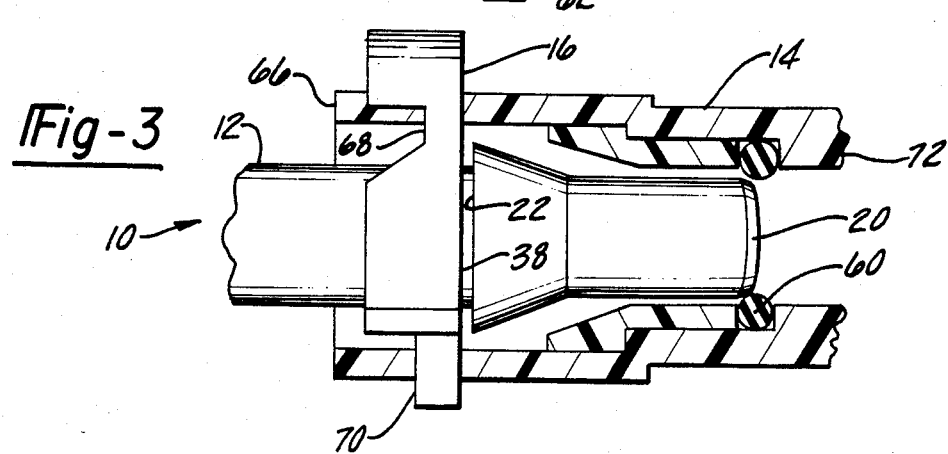

SWIVELABLE QUICK CONNECTOR ASSEMBLY

This is a division of application Ser. No. 201,711, filed Oct. 29, 1980 and now U.S. Pat. No. 4,423,892.

BACKGROUND AND SUMMARY OF THE INVENTION

The present invention relates to a connector assembly for providing a swivelable quick connection.

In the automotive industry, as well as for many other industries, the need always exists for low-cost, reliable, and easy to assemble components. This need is especially apparent with respect to providing a connection between fluid carrying conduits, such as a fuel or refrigerant lines. In older threaded connectors, substantial assembly time could be accumulated in screwing on a cap to a fitting and tightening the cap down to the proper torque needed to provide for a fluid tight seal. Further, an inventory would have to be maintained to keep track of the number of caps and fittings, and any liners or other components that may be necessary. Also, retightening of the caps may be required to maintain the seal after the automobile or other system has been put in use.

Accordingly, it is the primary object of the present invention to provide an improved connector assembly for providing a swivelable quick connection between fluid conveying conduits.

In addition, it is an object of the present invention to provide a pre-assembled connector housing and retainer element so that a connection to a tubular fluid conveying conduit may be made in one step without resorting to any tools.

Another object of the present invention is to provide a pre-assembled connector housing and retainer element so that a snapping connection may be made to a tubular fluid conveying conduit.

Another object of the present invention is to provide a connector assembly that may be employed to join dissimilar electrically conducting materials that would be otherwise subject to galvanic corrosion.

It is a further object of the present invention to provide a connector assembly which is adapted to provide a for a bleed-down position when disconnecting a conduit from the housing of the connector assembly.

Additional objects and advantages of the present invention will become apparent from a reading of the detailed description of the preferred embodiments which makes reference to the following set of drawings in which:

BRIEF DESCRIPTION OF THE DRAWINGS

FIG. 1 is a perspective assembly view of a first embodiment of the present invention.

FIG. 2 is a side elevation view, partially in cross-section, of the connector assembly of FIG. 1.

FIG. 3 is another view of the connector assembly of FIG. 2, shown in the bleed-down position.

DETAILED DESCRIPTION OF THE PREFERRED EMBODIMENTS

Figure 4:
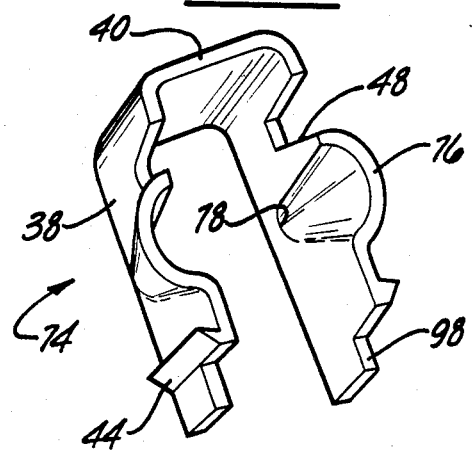
FIG. 4 is a perspective view of a second embodiment of a retainer element according to the present invention.

Referring to FIG. 1, a perspective assembly view of a connector assembly 10 according to the present invention is shown. The connector assembly is generally comprised of a tubular conduit 12 adapted to convey fluid, a housing 14, and a retainer element 16. Conduit 12 is provided with an outwardly projecting annular surface 18 displaced from a beveled connecting end 20 of the conduit. Annular surface 18 is formed with a blocking wall portion 22 disposed transversely or perpendicularly to a central axis 24 of conduit 12, and a sloping wall portion 26 gradually increasing from an outer surface 28 of the conduit. Housing 14 may have any suitable outer surface shape, and in one form of the present invention, the housing is provided with an enlarged diameter portion 30, a reduced diameter portion 32, and a third diameter portion 34. The housing is adapted to provide for apertures or openings 36 a-d, which are equidistantly spaced around the circumference of enlarged portion 30 of the housing. Apertures 36 are provided to receive and position retainer element 16 transversely to axis 24 of the conduit. The retainer element is made from a resilient material, such as plastic, and is comprised of a pair of generally parallel elongated legs 38 joined at one end by a cross member 40, which provides a separation between the legs approximately equal to the outside diameter of conduit 12. Each retainer leg 38 includes a sloping lead area 42 formed in the interior side of the leg, and a barb 44 projecting from the exterior side of the leg. In addition, each retainer leg further includes a first recess 46 and a second recess 48 formed in the front side of the leg.

Referring to FIG. 2, a side elevation view of connector assembly 10 is shown, partially in cross-section, in a fully assembled position. Housing 14 is shown to be formed with a central bore 50, having an enlarged diameter portion 52, a reduced diameter portion 54, and a third diameter portion 56. Housing 14 also includes a bushing 58 and an elastomeric ring 60 disposed in third diameter portion 56 of housing central bore 50. Bushing 58 also includes a flange portion 62, which extends into enlarged diameter portion 52 of central bore 50. A surface 64 of flange portion 62 is shaped to provide a slope corresponding to sloping wall portion 26 of conduit 12.

In the preferred embodiment, connector assembly 10 may be connected by first coupling retainer element 16 to housing 14, and then inserting connecting end 20 of conduit 12 into central bore 50 of the housing. Retainer element 16 is coupled to housing 14 by inserting legs 38 into apertures 36a and 36b and out through apertures 36c and 36d until barbs 44 extend through apertures 36c and 36d. Barbs 44 projects outwardly a distance sufficient to engage the upper edges of apertures 36c and 36d and prevent the removal of the retainer element from the housing. Apertures 36 a–d are shaped sufficiently large to permit both an inward and outward deflection of retainer legs 38. When retainer element 16 is being inserted into housing 14, the retainer legs deflect inwardly to permit barbs 44 to entend through apertures 36c and 36d. When connecting end 20 of conduit 12 is being inserted into bore 50 of housing 14, the retainer legs deflect outwardly to permit annular surface 18 to translate past the retainer legs. Sloping wall portion 26 of annular surface 18 cooperates with sloping lead area 42 of retainer legs 38 to reduce the force required to translate the annular surface past the retainer legs. After conduit 12 is fully inserted into central bore 50 of housing 14, as shown in FIG. 2, retainer legs 38 cooperate with blocking wall portion 22 of annular surface 18 to resist the disconnection or removal of conduit 12 from housing 14.

An important feature of housing 14 is elastomeric ring 60. This ring provides a fluid tight seal between conduit 12 and housing 14, and yet permits the conduit to rotate or swivel relative to the housing. Ring 60 is positioned transversely to axis 24 of conduit 12 by bushing 58. Flange portion 62 of bushing 58 provides a means for impeding further insertion of conduit 12 within central bore 50 when surface 64 of flange portion 62 contacts sloping wall portion 26 of annular surface 26 of the conduit.

Referring to FIG. 3, another view of connector assembly 10 is shown. Here, the connector assembly is illustrated in the "bleed-down" position. This feature of the invention may be used to safely disconnect conduit 12 from housing 14 when the fluid pressure is greater than ambient. Accordingly, retainer element 16 is partially removed or lifted up to the point where first and second recesses, 46 and 48 respectively, permit the retainer element to be translated toward a first end 66 of housing 14, in the direction of the arrows shown in FIG. 2. Surfaces 68 and 70 of the retainer recesses will engage the vertical edges of apertures 36 a–d adjacent to housing end 66, and prevent further axial translation of retainer element 16. Conduit 12 may then also be translated toward housing end 66, past the point where elastomeric ring 60 contacts conduit end 20. This will interrupt the fluid tight seal, and permit the pressure of the fluid to rapidly decrease. When this seal is broken, legs 38 of retainer element 16 will prevent the total ejection of the conduit from the housing under the force of the fluid pressure by engaging blocking wall portion 22 of annular surface 18. After the fluid pressure has decreased to the ambient pressure, the conduit may then be translated back toward a second end 72 of the housing, so that the retainer element may be removed. The conduit may then be removed from the housing without any obstruction.

Referring to FIG. 4, a second embodiment of a retainer element 74 is shown. Retainer element 74 is similar to retainer element 16, and the reference numerals for the corresponding components are the same. As in the case of retainer element 16, retainer element 74 is an integral element, formed in any conventional manner from a resilient material, such as plastic. The difference between these retainers resides in the lead areas formed in the sides of legs 38. Retainer element 74 is formed with an annular outwardly extending lead area 76 in each of the legs. Lead areas 76 have approximately the same thickness as the thickness of legs 38. Lead areas 76 may extend to the back surface of retainer element 74, or may only partially extend the width of legs 38, as shown in FIG. 4 at reference numeral 78. In contrast, lead areas 42 of retainer element 16 do not outwardly extend. Rather, lead areas 42 are recessed in the interior sides of legs 38 for retainer element 16. Thus, the thickness of legs 38 for retainer element 16 is reduced at the front surface of the legs, and gradually increases to the normal leg thickness at the back surface.

Figure 5:
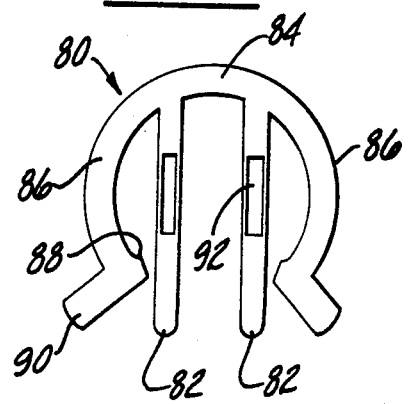
FIG. 5 is a front elevation view of a third embodiment of a retainer element according to the present invention.

Referring to FIG. 5, a third embodiment of a retainer element 80 is shown. Retainer element 80 is also intended for use with housing 14 shown in FIG. 1. Retainer element 80 is made from a resilient material, and is comprised of a pair of generally parallel elongated legs 82 joined at one end by a cross number 84, which is extended to form annular members 86. These annular members generally conform to and partially encircle the outside surface of enlarge diameter portion 30 of housing 14. Annular members 86 are each formed with a barb 88 and a handle 90. Legs 82 are each formed with a lead area 92 similar in shape to lead area 42 for legs 38 of retainer element 16.

Retainer element 80 is coupled to housing 14 by inserting legs 82 into apertures 36a and 36b and out through apertures 36c and 36d. As legs 82 are being inserted, annular members 86 deflect outwardly to permit their translation around the outside surface of housing 14. When the retainer element is inserted, barbs 88 will extend inwardly into apertures 36c and 36d to lock the retainer element in place. Handles 90 are used to assist the removal of retainer element 80 from housing 14, which is achieved by deflecting annular member 86 outwardly to disengage barbs 88 from the appertures and lifting the retainer element out from the housing.

Figure 6:
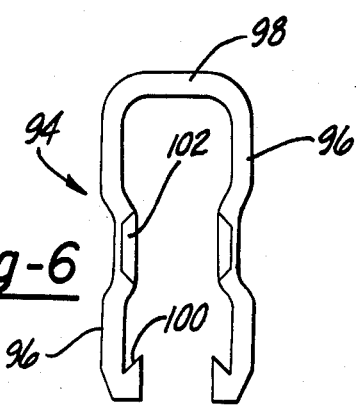
FIG. 6 is a front elevation view of a fourth embodiment of a retainer element according to the present invention.

Referring to FIG. 6, a fourth embodiment of a retainer element 94 is shown. Again, retainer element may be used with housing 14, and is made from a resilient material. Retainer element 94 is comprised of a pair of generally parallel elongated legs 96 joined at one end by a cross member 98. Legs 96 are each formed with an inwardly extending barb 100, and a lead area 102 similar in shape to lead area 42 of retainer element 16. Retainer element 94 is coupled to housing 14 by deflecting legs 96 outwardly a sufficient distance to permit their insertion into apertures 36a and 36b and out through apertures 36c and 36d. When fully inserted, barbs 100 engage the lower lateral edges of apertures 36c and 36d to lock retainer element 94 in place.

Figure 7:
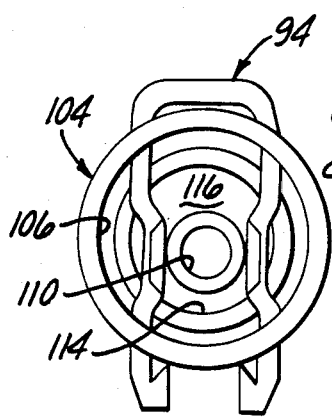
FIG. 7 is a front elevation view of the retainer element of FIG. 6 coupled to a housing according to the present invention.
Figure 8:
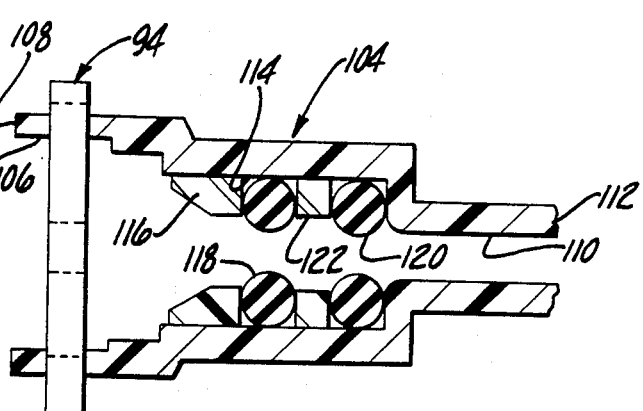
FIG. 8 is a side elevation view, partially in cross-section, of the retainer element and housing of FIG. 7.

Referring to FIGS. 7 and 8, retainer element 94 is shown coupled to a housing 104, similar in construction to housing 14. FIG. 7 is a front elevation view and FIG. 8 is a side elevation view partially in cross-section. Housing 104 is provided with an enlarged diameter portion 106 at a first end 108 for receiving a conduit and for mounting retainer element 94, and a reduced diameter portion 110 at a second end 112 for providing a fluid path. Housing 104 is also provided with a third diameter portion 114 interposed between enlarged diameter portion 106 and reduced diameter portion 110. Housing 104 further includes a bushing 116, two elastomeric rings 118 and 120, and an annular sleeve 122 for separating the rings. This housing illustrates that more than one elastomeric ring may be employed to provide a fluid tight seal, as may be required for the particular application of the connector assembly.

Figure 9:
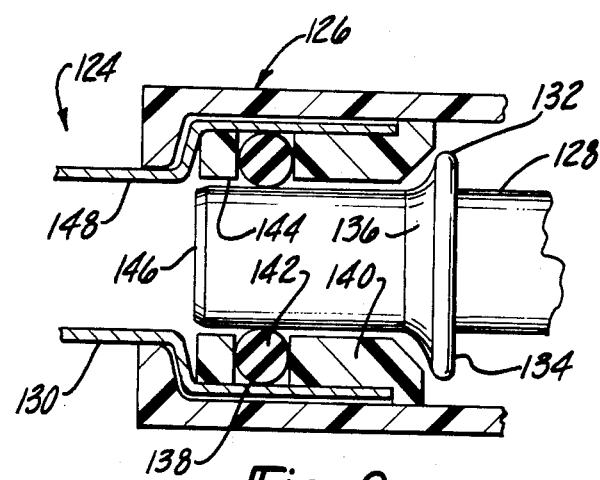
FIG. 9 is a side elevation view, partially in cross-section, of another embodiment of the connector assembly according to the present invention.

Referring to FIG. 9, another embodiment of a connector assembly 124 according to the present invention is shown. This embodiment illustrates a housing 126 that may be employed to provide a fluid tight connection between a tubular conduit 128 and a metallic tubular conduit 130. As in the case of conduit 12 of FIG. 1, conduit 128 includes an outwardly projecting annular surface 132, which is formed with a blocking wall portion 134 and a sloping wall portion 136. Conduit 130 is formed with an enlarged diameter portion 138, which provides the third diameter portion of the above described housings 14 and 104. Housing 126 is provided with a bushing 140, an elastomeric ring 142, and a spacer 144 mounted in enlarged diameter portion 138 of conduit 130. Both bushing 140 and spacer 144 are made from an electrically non-conductive material, such as plastic, and serve an important function when both conduits 128 and 130 are made from dissimilar metals subject to galvanic corrosion. Bushing 140 and spacer 144 support conduit 128 within housing 126 and preclude an end 146 of conduit 128 from contacting a reduced diameter portion 148 of conduit 130. Thus, where the fluid being conveyed is a liquid having the properties of an electrolyte, bushing 140 and spacer 144 prevent the completion of a circuit loop which would allow a corrosion current to flow. Housing 126, as well as housings 14 and 104, may be made from either plastic or metal. Any of the retainer elements 16, 74, 80, or 94 may be coupled with housing 126 in the manner described above.

Figure 10:
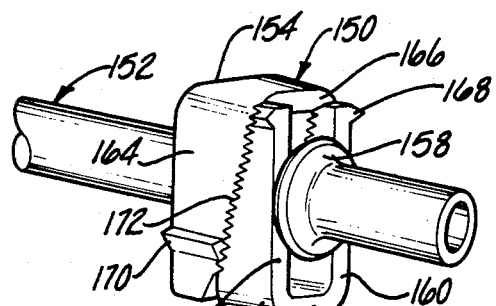
FIG. 10 is a perspective view of a fifth embodiment of a retainer element, and its relationship to a conduit is illustrated.

Referring to FIG. 10, a fifth embodiment of a retainer element 150 is shown in relation to a conduit 152. Retainer element 150 is comprised of two wedge shaped members 154 and 156, which combine to form a jam fit against the blocking wall portion (not shown) of an annular surface 158 of conduit 152. Wedge member 156 is comprised of a pair of generally parallel elongated legs 160 joined at one end by a cross member 162. Similarly, wedge member 154 is comprised of a pair of generally parallel elongated legs 164 joined at one end by a cross member 166. Wedge member 156 further includes an outwardly extending barb 168 formed at the end of each of legs 160. Similarly wedge member 154 includes an outwardly extending barb 170 formed in the side of each of legs 164. The sides of the legs 160 and 164 where wedge members 156 and 154 are joined are reciprocably slanted and formed with serrations, as indicated generally at reference number 172. Retainer element 150 may be coupled to a housing, such as housing 14 of FIG. 1 to force annular surface 158 of conduit 152 securely against a bushing, such as bushing 58 of FIG. 2. Retainer element 150 may be coupled to housing 14 by inserting legs 164 of wedge member 154 into apertures 36a and 36b, and inserting legs 160 of wedge member 156 into apertures 36c and 36d in a similar manner to that described above for retainer element 16. As the wedge members are being inserted, the serrated edges of legs 160 and 164 engage and exert a further insertion force on conduit 152 via annular surface 158. After the wedge members are fully inserted, the serrated edges of legs 160 and 164 fixedly hold the wedge members in their relative positions. It of course should be appreciated by one skilled in the art that conduit 152 may be inserted into housing 14 before the wedge members are coupled to the housing.

Figure 11:
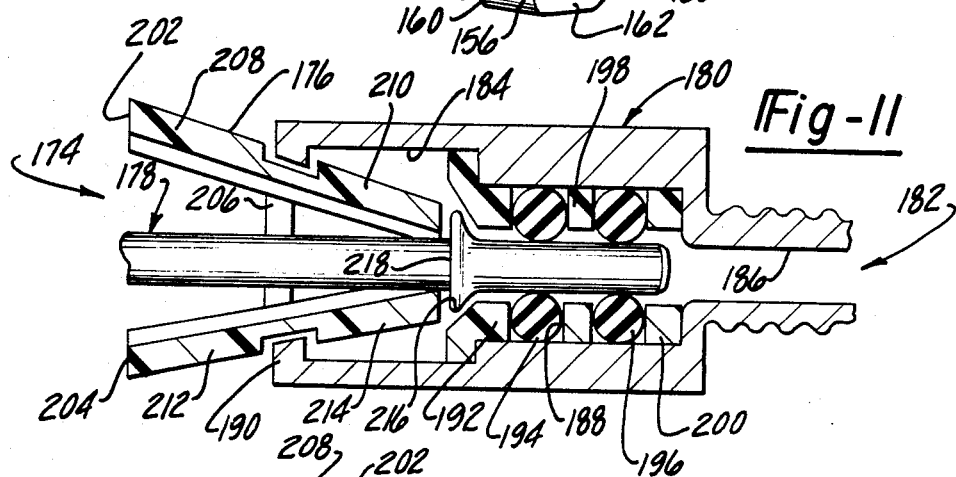
FIG. 11 is a side elevation view of another embodiment of the connector assembly according to the present invention.
Figure 12:
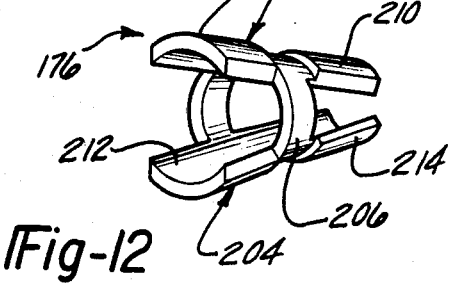
FIG. 12 is a perspective view of the retainer element of FIG. 11.

Referring to FIGS. 11 and 12, another embodiment of a connector assembly 174 according to the present invention is shown. FIG. 12 illustrates a perspective view of a retainer element 176, and FIG. 11 illustrates a side elevation view, partially in cross-section, of the fully assembled connector assembly. Connector assembly 174 is comprised of a tubular conduit 178, a housing 180, and retainer element 176. Housing 180 may be made from any suitable material, such as plastic or metal, and may have any appropriate outer shape, such as a cylinder or hex construction. Housing 180 is formed with a central bore 182, which provides an enlarged diameter portion 184, a reduced diameter portion 186, and a third diameter portion 188. Housing 180 further includes an inwardly extending flange 190, forming a forth diameter portion, for mounting retainer element 176 to the housing. Flange 190 may have a slant shape as shown in FIG. 11 or may have a flat surface. Housing 180 is also provided with a bushing 192, two elastomeric rings 194 and 196, a sleeve 198, and a spacer 200 generally mounted in third diameter portion 188. Retainer element 176 is made from a resilient material, and is comprised of a pair of opposing annular leg members 202 and 204 centrally joined by a recessed ring 206, which positions the retainer element at flange 190 of housing 180. Annular leg 202 is formed with a radially extending tab end 208 on one side of recessed ring 206 and a radially converging jaw end 210 on the other side of the recessed ring. Similarly, annular leg 204 is formed with a radially extending tab 212 on one side of recessed ring 206 and a radially converging jaw 214 on the other side. As illustrated in FIG. 11, the distance between annular leg members 202 and 204 at the converging ends corresponds approximately to the outside diameter of conduit 178. Retainer element 176 is coupled to housing 180 by insertion into central bore 182 until flange 190 engages or straddles recessed ring 206. Conduit 178 is then inserted into central bore 182 with an insertion force sufficient to deflect converging jaw ends 210 and 214 outwardly to permit an annular surface 216 of the conduit to be translated passed retainer element 176. After conduit 178 is fully inserted into housing 180, converging jaw ends 210 and 214 of retainer element 176 cooperate with a blocking wall portion 218 of annular surface 216 to resist the disconnection or removal of conduit 178 from the housing. Conduit 178 may be removed from housing 180 by compressing extending tab ends 208 and 212 together sufficiently to extend converging jaw ends 210 and 214 apart, so that the conduit may be extracted from the housing without having to remove retainer element 176.

Figure 13:
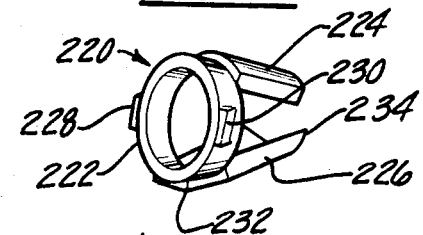
FIG. 13 is a perspective view of another embodiment of the retainer element for the connector assembly of FIG. 11.

Referring to FIG. 13, another embodiment of a retainer element 220 for the connector assembly of FIG. 11 is shown. Retainer element 220 is made from a resilient material, and is comprised of a ring 222 for mounting the retainer element on flange 190 of housing 180, a pair of opposing jaws 224 and 226 projecting from one side of the ring, and a pair of tabs 228 and 230 projecting from the other side of the ring and positioned on opposite sides of the jaws. Ring 222 is formed with an outer diameter approximately corresponding to the bore diameter provided by flange 190 of housing 180. Jaws 224 and 226 extend beyond the outer diameter of ring 222 at an end 232 and converge at another end 234 to provide a separation approximately corresponding to the outside diameter of conduit 178. When retainer element 220 is coupled to housing 180, flange 190 is interposed between tabs 228 and 230, and extending end of jaws 224 and 226. Retainer element 220 operates to maintain conduit 178 in housing 180 in a similar manner to that described above for retainer element 176. However, retainer element 220 is of a simplified design in that the retainer element is not provided with an integral means to assist the removal of conduit 178 from housing 180.

Figure 14:
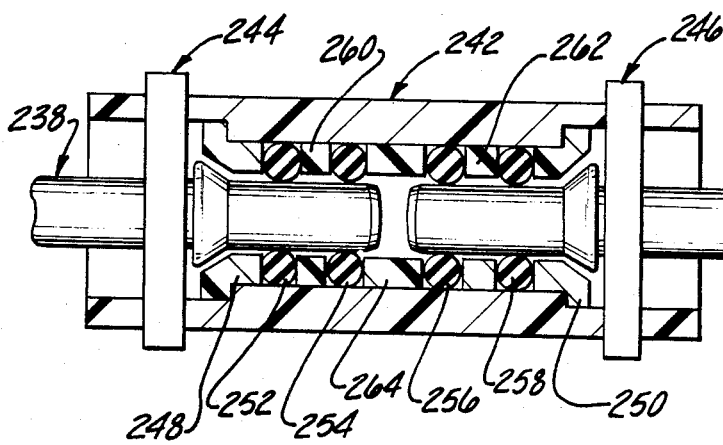
FIG. 14 is a side elevation view, partially in cross-section of another embodiment of the connector assembly according to the present invention.

Referring to FIG. 14, another embodiment of a connector assembly 236 according to the present invention is shown. Connector assembly 236 represents a union-type connector, and is essentially a duplicate of the structure described above for the previous embodiments. Generally, connector assembly 236 is comprised of two conduits 238 and 240, a housing 242, and a pair of retainer elements 244 and 246. Housing 242 includes a pair of bushings 248 and 250, a set of four elastomeric rings 252–258, a pair of sleeves 260 and 262, and a central spacer 246.

While the above description constitutes the preferred embodiment of the present invention, it will be appreciated that the invention is susceptible to modification, variation and change without departing from the proper scope and fair meaning of the accompanying claims.

What is claimed is:

1. A connector assembly for providing a swivelable quick connection, comprising:
   a tubular conduit adapted to convey fluid, having outwardly projecting annular surface means, formed at a predetermined distance from an end of said conduit to be connected, for providing a blocking wall portion disposed transversely to a central axis of said conduit;
   a housing having axial bore means formed therein for receiving said conduit at a first end and for providing a fluid path at a second end, said bore means forming an enlarged first diameter portion at said first end of said housing, and a reduced second diameter portion at said second end of said housing, elastomeric ring means disposed in said bore means for providing a seal between said conduit and said housing, and annular bushing means disposed in said bore means for positioning said ring means and for guiding the insertion of said conduit into a sealing engagement with said ring means; and
   retainer means, demountably coupled to said first end of said housing, for cooperating with said blocking wall portion of said annular surface means to resist the disconnection of said conduit from said housing said retainer means having a pair of generally parallel elongated legs joined at one end by a cross member formed to provide a separation of said legs approximately equal to the outside diameter of said conduit, and said retainer means also having a lead area formed in the interior side of each of said legs which is sloped from the front surface of said retainer means in a direction towards the back surface of said retainer means, the thickness of said retainer means lead areas at the front surface being less than the thickness of said retainer means lead areas at the back surface.

2. The connector assembly to claim 1, wherein said ring means is comprised of two elastomeric rings.

3. The connector assembly according to claim 2, further including annular sleeve means disposed in said bore means, for separating said elastomeric rings.

4. The connector assembly according to claim 1, wherein said housing is adapted to provide for aperture means, opening to said first diameter portion of said bore means, for receiving said legs of said retainer means and for positioning said legs transversely to said axis of said conduit.

5. The connector assembly according to claim 4, wherein said aperture means is adapted to permit said legs to extend beyond the outside surface of said housing after said retainer means is coupled to said housing.

6. The connector assembly according to claim 5, wherein said aperture means is comprised of four equidistantly spaced openings.

7. The connector assembly according to claim 6, wherein said annular surface means is interposed between said legs of said retainer means and said bushing means after said conduit end to be connected is fully inserted into said housing.

8. The connector assembly according to claim 7, wherein said retainer means is formed from a resilient material, and said legs of said retainer means are deformable.

9. The connector assembly according to claim 8, wherein said openings of said aperture means are shaped to permit said legs of said retainer means to deflect radially outwardly with respect to said axis of said conduit.

10. The connector assembly according to claim 9, wherein said retainer means includes barb means, disposed on said legs, for demountably locking said retainer means to said housing.

11. The connector assembly according to claim 9, wherein said cross member of said retainer means is extended to form annular members generally conforming to and partially encircling said outside surface of said housing.

12. The connector assembly according to claim 11, wherein each of said annular members includes barb means for demountably locking said retainer means to said housing.

13. The connector assembly according to claim 9, wherein said retainer means is coupled to said housing before the insertion of said conduit into said bore means of said housing.

14. The connector assembly according to claim 4, wherein said retainer means includes recess means, formed in said legs, for cooperating with said aperture means when said retainer means is partially removed from said housing to permit said conduit to be translated to a bleed down position within said bore means of said housing.

15. The connector assembly according to claim 1, wherein said bore means provides for a third diameter portion interposed between said first and second diameter portions, having a magnitude less than said first diameter portion and greater than said second diameter portion.

16. The connector assembly according to claim 15, wherein said ring means and said bushing means are disposed in said third diameter portion of said bore means.

17. The connector assembly according to claim 16, wherein said bushing means includes an enlarged diameter flange portion extending into said first diameter portion of said bore means.

18. The connector assembly according to claim 17, wherein said flange portion of said bushing means cooperates with said bore means of said housing to impede further axial insertion movement of said conduit within said housing when said annular surface means of said conduit contacts said flange portion of said bushing means.

19. The connector assembly according to claim 16, wherein said ring means is comprised of at least one elastomeric ring having an outer diameter appropriately greater than said third diameter portion of said bore means and an inner diameter appropriately smaller than the outside diameter of said conduit, so that a fluid tight seal is provided between said conduit and said housing.

20. The connector assembly according to claim 17, wherein said annular surface means includes a sloping wall portion facing said end of said conduit to be connected and opposite said blocking wall portion.

21. The connector assembly according to claim 20, wherein said flange portion of said bushing means is formed with a sloping surface corresponding to said sloping wall portion of said annular surface means.

22. The connector assembly according to claim 19, further including an annular spacer member disposed in said third diameter portion of said bore means and positioned between said elastomeric ring means and said second diameter portion of said bore means.

23. The connector assembly according to claim 22, wherein said housing is made from an electrically conducting material, and said bushing means and said spacer member are made from an electrically non-conducting material.

24. The connector assembly according to claim 23, wherein said spacer member prevents said connecting end of said conduit from contacting said housing at said second diameter portion of said bore means.

25. The connector assembly according to claim 24, wherein said predetermined distance of said annular surface means from said conduit end to be connected corresponds approximately to the length of said third diameter portion of said bore means.

26. The connector assembly according to claim 1, wherein the front and back surfaces of the retainer means legs are generally flat.

27. An assembly for providing a swivelable connection with a tubular conduit having a blocking wall portion, comprising:
a housing having axial bore means formed therein for receiving said conduit at a first end and for providing a fluid path at a second end, said bore means formed with a first diameter portion at said first end of said housing, a second diameter portion at said second end of said housing, and a third diameter portion interposed between said first and second diameter portions and having a magnitude less than said first diameter portion and greater than said second diameter portion, said housing also being formed to provide a plurality of apertures in said first diameter portion;
elastomeric ring means disposed in said third diameter portion of housing for providing a seal between said conduit and said housing;
annular bushing means generally disposed in said third diameter portion of said housing for positioning said ring means in said third diameter portion of said housing;
retainer means, demountably coupled to said housing through said apertures in said first diameter portion of said housing, for cooperating with said blocking wall portion of said conduit to resist the disconnection of said conduit from said housing after said conduit has been inserted into said housing, said retainer means comprising a retainer element having a pair of generally parallel elongated legs joined at one end by a cross member portion formed to provide a predetermined separation between said legs, each of said legs including sloping lead means extending from the front surface of said retainer element in a direction towards the back surface of said retainer element for reducing the force required to insert said conduit into said housing, the thickness of said retainer element legs at said sloping lead areas being less at the front surface of said retainer element than at the back surface of said retainer element.

28. The assembly according to claim 27, wherein said apertures are shaped to permit said legs of said retainer element to deflect radially outwardly with respect to the axis of said conduit when said conduit is being inserted into said housing.

29. The assembly according to claim 28, wherein the front and back surfaces of said retainer element legs are generally flat.

30. An assembly for providing a swivelable connection with a tubular conduit having a blocking wall portion, comprising:
a housing having axial bore means formed therein for receiving said conduit at a first end and for providing a fluid path at a second end, said bore means formed with a first diameter portion at said first end of said housing, a second diameter portion at said second end of said housing, and a third diameter portion interposed between said first and second diameter portions and having a magnitude less than said first diameter portion and greater than said second diameter portion, said housing also being formed to provide a plurality of apertures in said first diameter portion;
elastomeric ring means disposed in said third diameter portion of housing for providing a seal between said conduit and said housing;
annular bushing means generally disposed in said third diameter portion of said housing for positioning said ring means in said third diameter portion of said housing;
retainer means, demountably coupled to said housing, for cooperating with said blocking wall portion of said conduit to resist the disconnection of said conduit from said housing after said conduit has been inserted into said housing, said retainer means including recess means for cooperating with said aperture means when said retainer means is partially removed from said housing to permit said conduit to be translated to a bleed down position within said bore means of said housing.

* * * * *

UNITED STATES PATENT AND TRADEMARK OFFICE
CERTIFICATE OF CORRECTION

PATENT NO. : 4,524,995
DATED : June 25, 1985
INVENTOR(S) : Donald D. Bartholomew It is certified that error appears in the above-identified patent and that said Letters Patent is hereby corrected as shown below:

```
In the Abstract:  Line 5, "fluidtight" should be two words

Column 1, line 15 - delete "a"

Column 3, line 15 - "entend" should be --extend--

Column 4, line 26 - "enlarge" should be --enlarged--

Column 4, line 36 - after "is" insert --fully--

Column 4, line 41 - "appertures" should be --apertures--

Column 7, line 4 - "178" (second occurrence) should be --180--

Column 7, line 19 - "246" should be --264--

Column 7, line 62 - after "assembly" insert --according--
```

Signed and Sealed this

Seventh Day of January 1986

[SEAL]

Attest:

DONALD J. QUIGG

Attesting Officer

Commissioner of Patents and Trademarks